United States Patent
Geng et al.

(10) Patent No.: US 11,245,620 B2
(45) Date of Patent: Feb. 8, 2022

(54) METHOD FOR FORWARDING PACKET AND NETWORK DEVICE

(71) Applicant: HUAWEI TECHNOLOGIES CO., LTD., Shenzhen (CN)

(72) Inventors: Xuesong Geng, Beijing (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/226,443

(22) Filed: Apr. 9, 2021

(65) Prior Publication Data

US 2021/0226889 A1 Jul. 22, 2021

Related U.S. Application Data

(63) Continuation of application No. 16/830,214, filed on Mar. 25, 2020, which is a continuation of application No. PCT/CN2018/107310, filed on Sep. 25, 2018.

(30) Foreign Application Priority Data

Sep. 25, 2017 (CN) .......................... 201710873391.1

(51) Int. Cl.
  *H04L 12/723* (2013.01)
  *H04L 29/06* (2006.01)
  (Continued)

(52) U.S. Cl.
  CPC .......... *H04L 45/50* (2013.01); *H04L 12/4633* (2013.01); *H04L 45/24* (2013.01);
  (Continued)

(58) Field of Classification Search
  None
  See application file for complete search history.

(56) References Cited

U.S. PATENT DOCUMENTS 6,751,746 B1    6/2004 Jain et al.
6,831,898 B1   12/2004 Edsall et al.
(Continued)

FOREIGN PATENT DOCUMENTS

CN         1881898 A     12/2006
CN       101257441 A      9/2008
(Continued)

OTHER PUBLICATIONS

S. Bryant, Ed.: Pseudo Wire Emulation Edge-to-Edge (PWE3) Architecture Request for Comments: 3985 Mar. 2005 total 42 pages.

*Primary Examiner* — Eunsook Choi
(74) *Attorney, Agent, or Firm* — Rimon PC

(57) ABSTRACT

A method for forwarding a packet, and a network device are provided. According to the method a first packet can be received. The first packet includes first indication information, payload data, and a packet sequence number of the first packet in a data flow corresponding to the first packet. When the first network device determines that the first packet includes the first indication information, a plurality of second packets can be generated based on the first packet. Each of the plurality of second packets includes the payload data, the packet sequence number, and second indication information. The plurality of second packets can be separately forwarded to a second network device over different forwarding paths in a plurality of forwarding paths.

15 Claims, 13 Drawing Sheets

(51) Int. Cl.
  *H04L 12/46* (2006.01)
  *H04L 12/707* (2013.01)
  *H04L 12/741* (2013.01)
  *H04L 12/851* (2013.01)
  *H04L 12/801* (2013.01)

(52) U.S. Cl.
  CPC .......... *H04L 45/74* (2013.01); *H04L 47/2483* (2013.01); *H04L 47/34* (2013.01); *H04L 69/22* (2013.01)

(56) References Cited

U.S. PATENT DOCUMENTS

| | | | |
|---|---|---|---|
| 6,956,822 | B2 | 10/2005 | Hujber |
| 7,373,543 | B1 | 5/2008 | Jain et al. |
| 8,144,711 | B1 | 3/2012 | Pegrum et al. |
| 8,189,588 | B2 | 5/2012 | Yadav et al. |
| 9,985,872 | B2 | 5/2018 | Jaffer et al. |
| 10,158,558 | B1 | 12/2018 | Ward et al. |
| 10,833,980 | B2 | 11/2020 | Jaffer et al. |
| 2010/0235593 | A1 | 9/2010 | Yadav et al. |
| 2014/0105033 | A1 | 4/2014 | Vasseur et al. |
| 2014/0161135 | A1* | 6/2014 | Acharya ............. H04L 47/6255 370/412 |
| 2015/0256469 | A1 | 9/2015 | Iwakura |
| 2015/0365319 | A1 | 12/2015 | Finn |
| 2017/0237656 | A1 | 8/2017 | Gage |
| 2017/0250908 | A1* | 8/2017 | Nainar ................ H04L 12/4633 |
| 2017/0289846 | A1 | 10/2017 | Wetterwald et al. |
| 2018/0241671 | A1* | 8/2018 | Bosch ................... H04L 67/327 |
| 2018/0375763 | A1 | 12/2018 | Brissette et al. |
| 2019/0028575 | A1 | 1/2019 | Wetterwald et al. |
| 2019/0089645 | A1* | 3/2019 | Fu ....................... H04L 47/6275 |
| 2020/0120020 | A1* | 4/2020 | Dutta ..................... H04L 12/66 |
| 2020/0127913 | A1* | 4/2020 | Filsfils .................. H04L 45/04 |
| 2020/0145335 | A1* | 5/2020 | Wijnands .............. H04L 47/825 |
| 2020/0153733 | A1* | 5/2020 | Chunduri ................ H04L 45/38 |
| 2021/0226889 | A1* | 7/2021 | Geng ..................... H04L 45/22 |

FOREIGN PATENT DOCUMENTS

| | | |
|---|---|---|
| CN | 103607288 A | 2/2014 |
| CN | 105827529 A | 8/2016 |
| CN | 105959231 A | 9/2016 |
| CN | 106487537 A | 3/2017 |
| CN | 106549871 A | 3/2017 |
| JP | 2006324792 A | 11/2006 |
| JP | 2009124759 A | 6/2009 |
| JP | 2010278845 A | 12/2010 |
| JP | 2011151547 A | 8/2011 |
| JP | 2012257136 A | 12/2012 |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                              LOC                              |
+-+-+-+-+-+-+-+-+-+-+-+-+-+-+-+-+-+-+-+-+-+-+-+-+-+-+-+-+-+-+-+-+
| FUC |                       Flow ID                           |
+-+-+-+-+-+-+-+-+-+-+-+-+-+-+-+-+-+-+-+-+-+-+-+-+-+-+-+-+-+-+-+-+
|                               SN                              |
+-+-+-+-+-+-+-+-+-+-+-+-+-+-+-+-+-+-+-+-+-+-+-+-+-+-+-+-+-+-+-+-+
```

FIG. 3d

METHOD FOR FORWARDING PACKET AND NETWORK DEVICE

CROSS-REFERENCE TO RELATED APPLICATIONS

This application is a continuation of U.S. patent application Ser. No. 16/830,214, filed on Mar. 25, 2020, which is a continuation of International Application No. PCT/CN2018/107310, filed on Sep. 25, 2018, which claims priority to Chinese Patent Application No. 201710873391.1, filed on Sep. 25, 2017. All of the aforementioned applications are hereby incorporated by reference in their entireties.

TECHNICAL FIELD

The present disclosure relates to the field of communications technologies, and in particular, to a method for forwarding a packet and a network device.

BACKGROUND

With the rapid development of various network technologies, user data is usually encapsulated into a packet for transmission in a network. A network device in the network forwards the encapsulated packet, to implement transmission of the user data in the network. During packet forwarding, the network device forwards the packet based on path information in a header of the packet. For example, the path information may be multi-protocol label switching (MPLS). The network device receives a plurality of packets and separately transmits, based on path information of the packets, the plurality of packets to different network devices, to implement packet transmission in a point-to-multipoint mode. For example, a packet A1 is transmitted to a network device B1 through a path 1, a packet A2 is transmitted to a network device B2 through a path 2, and a packet A3 is transmitted to a network device B3 through a path 3. Due to various unexpected cases of network links between network devices, for example, an unstable network or a suddenly interrupted network, a packet loss may occur. Therefore, this packet transmission mode has relatively poor reliability.

SUMMARY

Embodiments provide a method for forwarding a packet and a network device. This can improve reliability of packet forwarding.

According to a first aspect, an embodiment provides a method for forwarding a packet in a network. The network includes a first network device and a second network device, and there are a plurality of forwarding paths between the first network device and the second network device. The first network device and the second network device may be routers, switches, or the like. This is not limited in this embodiment.

The first network device receives a first packet, where the first packet includes first indication information, payload data, and a packet sequence number. The packet sequence number may be a packet sequence number of the first packet in a data flow corresponding to the first packet. For example, the data flow corresponding to the first packet includes a plurality of packets. Each of the packets is assigned with a packet sequence number based on a sequence of sending the plurality of packets, and the packet sequence number is unique to each of the packets. It should be noted that when the first packet is forwarded by each network device on the forwarding path, the packet sequence number does not change.

The first indication information may be indication information used to instruct the first network device to generate a plurality of second packets based on the first packet.

When determining that the first packet includes the first indication information, the first network device generates the plurality of second packets based on the first packet, where each of the plurality of second packets includes the payload data carried in the first packet, the packet sequence number, and second indication information.

A manner in which the first network device generates the plurality of second packets based on the first packet may be as follows: The first network device replicates the first packet to obtain a plurality of replicated packets, pops unnecessary information (such as the first indication information) out from each of the replicated packets, and then pushes the second indication information, to obtain the plurality of second packets. Alternatively, a manner in which the first network device generates the plurality of second packets based on the first packet may be as follows: The first network device pops unnecessary information (such as the first indication information) out from the first packet; replicates a packet obtained after pop processing, to obtain a plurality of replicated packets; and pushes the second indication information to each of the replicated packets, to obtain the plurality of second packets. A manner of generating the plurality of second packets is not limited in this embodiment, and the foregoing is merely an example for description.

The first network device separately forwards the plurality of second packets to the second network device over different forwarding paths in the plurality of forwarding paths between the first network device and the second network device. For example, one forwarding path is used to forward one second packet. The second indication information included in each of the plurality of second packets is used to instruct the second network device to discard a packet in the plurality of second packets except a packet that first reaches the second network device.

In the foregoing technical solution, there are a plurality of forwarding paths between the first network device and the second network device, the first network device generates the plurality of second packets based on the first packet, and forwards the plurality of second packets to the second network device over the plurality of forwarding paths. Even if a network link of one of the plurality of forwarding paths is faulty, the second network device can receive the second packet forwarded on another forwarding path. Therefore, this improves reliability of packet transmission.

In an example design, the second packet further includes path information of a forwarding path corresponding to the second packet, and the path information of the forwarding path may be used to instruct to forward the second packet on the forwarding path. In some embodiments, if each of the plurality of second packets has a different forwarding path, path information of forwarding paths included in each packet is different. The path information of the forwarding path is encapsulated in the second packet, so as to indicate transmission of the second packet on a multi-segment network link.

In an example design, the first packet further includes a flow identifier of the data flow corresponding to the first packet. In this case, before generating the plurality of second packets, the first network device searches for path information of each of the plurality of forwarding paths associated with the flow identifier, so as to encapsulate the path information of the forwarding path into the second packet, where one second packet corresponds to one of the plurality of forwarding paths.

In the foregoing manner, the path information of the forwarding path is encapsulated in the second packet, so as to indicate transmission of the second packet on a multi-segment network link.

In an example design, the first indication information includes a first label, and the second indication information includes a second label. The first label corresponds to a first function, and the second label corresponds to a second function. The first function is used to instruct the first network device to generate the plurality of second packets. For example, the first label is a replication label and the first function is a function of replicating a packet. The second function is used to instruct the second network device to discard the packet in the plurality of second packets except the packet that first reaches the second network device. For example, the second label is a redundancy label, and the second function is a function of deleting a redundant packet. The path information of the forwarding path may include an MPLS label stack of the forwarding path.

In the foregoing manner, a label corresponding to a different function is encapsulated in the second packet, so that the network device can identify the label and perform a corresponding operation. This improves operation efficiency.

In an example design, the first indication information includes a third label, and the second indication information includes the third label. In other words, the first indication information is the same as the second indication information. The third label is used to identify the data flow corresponding to the first packet. Before generating the plurality of second packets, the first network device searches for an operation type corresponding to the third label. If the operation type corresponding to the third label is a target operation type, the first network device generates the plurality of second packets based on the first packet. The target operation type is used to instruct the first network device to generate the plurality of second packets. For example, the target operation type is a replication operation. The path information of the forwarding path may include an MPLS label stack of the forwarding path.

In the foregoing manner, the third label may not only be used to identify the data flow corresponding to the first packet, but also be used as different indication information. This reduces packet overheads.

In an example implementation, the first indication information includes first function information corresponding to a first address in a destination address field in an Internet Protocol version 6 (Internet Protocol version 6, IPv6) header of the first packet, and the first address matches a network address of the first network device. The first function information is used to instruct the first network device to generate the plurality of second packets. For example, the first function information is function information of replicating a packet.

The second packet includes a segment routing header (SRH), and the SRH includes the second indication information and path information of a forwarding path corresponding to the second packet. The path information of the forwarding path corresponding to the second packet may refer to a plurality of addresses in a plurality of segment lists in the SRH, and the plurality of addresses indicate the forwarding path. The second indication information includes second function information corresponding to a second address of a target segment list in the SRH, and the second address matches a network address of the second network device. The target segment list is one of the plurality of segment lists included in the SRH. The second function information is used to instruct the second network device to discard the packet in the plurality of second packets except the packet that first reaches the second network device. For example, the second function information is function information of deleting a redundant packet.

In the foregoing manner, the first function information and the second function information are extended in the segment list in the SRH, so that the foregoing method of forwarding a packet can be used in a network supporting an SRv6 protocol. This improves reliability of packet forwarding.

In an example design, the flow identifier and the packet sequence number that are included in the second packet may be encapsulated in a segment list in the SRH, for example, may be encapsulated in a segment list corresponding to the network address of the second network device. Alternatively, the flow identifier and the packet sequence may be encapsulated in each segment list. This is not limited in this embodiment. This manner reduces overheads of a packet header.

Alternatively, the second packet further includes an IPv6-based segment routing protocol (SRv6) header, and the flow identifier and the packet sequence number are encapsulated in the SRv6 header.

According to a second aspect, an embodiment provides a method for forwarding a packet in a network. The network includes a first network device and a second network device, and there are a plurality of forwarding paths between the first network device and the second network device. The first network device and the second network device may be routers, switches, or the like. This is not limited in this embodiment.

The second network device receives a second packet, where the second packet is any one of a plurality of second packets that are generated by the first network device based on a first packet. The second packet includes indication information, payload data carried in the first packet, and a packet sequence number, where the packet sequence number is a packet sequence number of the first packet in a data flow corresponding to the first packet. The indication information is used to instruct the second network device to discard a packet in the plurality of second packets except a packet that first reaches the second network device.

It should be noted that the second packet may be a packet obtained after processing is performed, by a network device on the forwarding path, on the second packet that is generated by the first network device. For example, the network device on the forwarding path re-encapsulates the second packet.

When determining that the second packet includes the indication information, the second network device searches a packet receiving table to determine whether there is the packet sequence number carried in the second packet, where the packet receiving table is used to record a packet sequence number included in the second packet that is in the plurality of second packets and that first reaches the second network device.

If the packet sequence number is not in the packet receiving table, it indicates that the second network device does not receive any one of the plurality of second packets sent by the first network device. The second network device stores the second packet. If the packet sequence number is in the packet receiving table, it indicates that the second packet is not the packet that is in the plurality of second packets and that first reaches the second network device. To avoid repeated storage, the second network device discards the second packet.

According to the foregoing technical solution, there are a plurality of forwarding paths between the first network device and the second network device. The first network device forwards the plurality of second packets to the second network device over the plurality of forwarding paths, and the second network device stores only the second packet that first reaches the second network device and discards another second packet. This can not only avoid repeatedly transmitting a same packet, but also improves reliability of packet transmission.

In an example design, the indication information may include a label corresponding to a target function, and the target function is used to instruct the second network device to discard the packet in the plurality of second packets except the packet that first reaches the second network device. For example, the target function is a function of deleting a redundant packet.

In the foregoing manner, the indication information is the label corresponding to the target function, so that the network device can identify the label and perform a corresponding operation. This improves operation efficiency.

In an example implementation, the indication information includes a label, and the label is used to identify the data flow corresponding to the first packet. Before the second network device searches the packet receiving table to determine whether there is the packet sequence number, the second network device needs to search for an operation type corresponding to the label. If the operation type corresponding to the label is a target operation type, the second network device searches the packet receiving table to determine whether there is the packet sequence number. The target operation type is used to instruct the second network device to discard the packet in the plurality of second packets except the packet that first reaches the second network device.

In the foregoing manner, the label may not only be used to identify the data flow, but also be used as indication information. This reduces packet overheads.

In an example implementation, the indication information may include target function information corresponding to a destination address in a destination address field in an IPv6 header of the second packet, and the destination address matches a network address of the second network device.

In the foregoing manner, the target function information is extended in an SRv6 protocol, so that a packet can be reliably transmitted in the SRv6 protocol.

In an example design, the network may further include a third network device. After storing the second packet, the second network device may further generate a third packet based on the second packet. For example, path information of a forwarding path of the third packet is added to the third packet. The second network device forwards the third packet to the third network device.

According to a third aspect, an embodiment provides a first network device for packet forwarding in a network. The first network device has a function of implementing an action of the first network device in the method according to the first aspect. The function may be implemented by hardware, or may be implemented by hardware executing corresponding software. The hardware or the software includes one or more modules corresponding to the foregoing function.

In an example implementation, the first network device includes a receive unit, a generation unit and a forwarding unit. The receive unit is configured to receive a first packet, where the first packet includes first indication information, payload data, and a packet sequence number of the first packet in a data flow corresponding to the first packet. The generation unit is generate, when the first network device determines that the first packet comprises the first indication information, a plurality of second packets based on the first packet, where each of the plurality of second packets includes the payload data, the packet sequence number, and second indication information. The forwarding unit is configured to separately forward the plurality of second packets to the second network device over different forwarding paths in the plurality of forwarding paths, where the second indication information is used to instruct the second network device to discard a packet in the plurality of second packets except a packet that first reaches the second network device.

In another possible implementation, the first network device includes a network interface, a memory, and a processor, where the network interface is configured to receive a packet or send a packet. The memory stores a set of program code and the processor is configured to invoke the program code stored in the memory, to perform the following operations: receiving a first packet through the network interface, where the first packet includes first indication information, payload data, and a packet sequence number of the first packet in a data flow corresponding to the first packet; when determining that the first packet includes the first indication information, generating a plurality of second packets based on the first packet, where each of the plurality of second packets includes the payload data, the packet sequence number, and second indication information; and separately forwarding the plurality of second packets to the second network device over different forwarding paths in the plurality of forwarding paths, where the second indication information is used to instruct the second network device to discard a packet in the plurality of second packets except a packet that first reaches the second network device.

In another possible implementation, the network device includes a main control board and an interface board. The main control board includes a first processor and a first memory. The interface board includes a second processor, a second memory, and an interface card. The main control board is coupled to the interface board. The second memory may be configured to store program code, and the second processor is configured to invoke the program code in the second memory to perform the following operation:

triggering the interface card to receive a first packet, where the first packet includes first indication information, payload data, and a packet sequence number of the first packet in a data flow corresponding to the first packet.

The first memory may be configured to store program code, and the first processor is configured to invoke the program code in the first memory to perform the following operation:

when determining that the first packet includes the first indication information, generating a plurality of second packets based on the first packet, where each of the plurality of second packets includes the payload data, the packet sequence number, and second indication information.

The second processor is configured to invoke the program code in the second memory to further perform the following operation: triggering the interface card to separately forward the plurality of second packets to the second network device over different forwarding paths in the plurality of forwarding paths, where the second indication information is used to instruct the second network device to discard a packet in the plurality of second packets except a packet that first reaches the second network device.

In some embodiments, an inter-process communication (inter-process communication, IPC) control channel is established between the main control board and the interface board.

Based on a same inventive concept, for a problem-resolving principle and beneficial effects of the first network device, refer to the method and beneficial effects brought by the method in the first aspect. Therefore, for implementation of the first network device, refer to implementation of the method. Repeated parts are not described again.

According to a fourth aspect, an embodiment provides a second network device for packet forwarding in a network. The second network device has a function of implementing an action of the second network device in the method according to the second aspect. The function may be implemented by hardware, or may be implemented by hardware executing corresponding software. The hardware or the software includes one or more modules corresponding to the foregoing function.

In an example implementation, the second network device includes a receive unit, a searching unit, a storage unit, and a discarding unit, where the receiving unit is configured to receive a second packet, the second packet is any one of a plurality of second packets generated by the first network device based on a first packet, and the second packet includes indication information, payload data carried in the first packet, and a packet sequence number of the first packet in a data flow corresponding to the first packet; the searching unit is configured to: when the second network device determines that the second packet includes the indication information, search a packet receiving table to determine whether there is the packet sequence number, where the packet receiving table is used to record a packet sequence number included in a packet that is in the plurality of second packets and that first reaches the second network device; the storage unit is configured to: if the packet sequence number is not in the packet receiving table, store the second packet; and the discarding unit is configured to: if the packet sequence number is in the packet receiving table, discard the second packet.

In another possible implementation, the second network device includes a network interface, a memory, and a processor, where the network interface is configured to receive and send a packet, the memory stores a set of program code, and the processor is configured to invoke the program code stored in the memory to perform the following operation: receiving a second packet through the network interface, where the second packet is any one of a plurality of second packets generated by the first network device based on the first packet, and the second packet includes indication information, payload data carried in the first packet, and a packet sequence number of the first packet in a data stream corresponding to the first packet; when determining that the second packet includes the indication information, searching a packet receiving table to determine whether there is the packet sequence number, where the packet receiving table is used to record a packet sequence number included in a packet that is in the plurality of second packets and that first reaches the second network device; if the packet sequence number is not in the packet receiving table, storing the second packet; and if the packet sequence number is in the packet receiving table, discarding the second packet.

In another possible implementation, the second network device includes a main control board and an interface board. The main control board includes a first processor and a first memory. The interface board includes a second processor, a second memory, and an interface card. The main control board is coupled to the interface board.

The second memory may be configured to store program code, and the second processor is configured to invoke the program code in the second memory to perform the following operation:

triggering the interface card to receive a second packet, where the second packet is any one of a plurality of second packets generated by the first network device based on a first packet, and the second packet includes indication information, payload data carried in the first packet, and a packet sequence number of the first packet in a data stream corresponding to the first packet.

The first memory may be configured to store program code, and the first processor is configured to invoke the program code in the first memory to perform the following operation:

when determining that the second packet includes the indication information, searching a packet receiving table to determine whether there is the packet sequence number, where the packet receiving table is used to record a packet sequence number included in a packet that is in the plurality of second packets and that first reaches the second network device; if the packet sequence number is not in the packet receiving table, storing the second packet; and if the packet sequence number is in the packet receiving table, discarding the second packet.

In some embodiments, an IPC control channel is established between the main control board and the interface board.

According to a fifth aspect, an embodiment provides a computer storage medium, configured to store a computer software instruction used by the foregoing first network device and/or the foregoing second network device. The computer software instruction includes a program designed to implement the foregoing aspects.

According to a sixth aspect, an embodiment provides a computer program product including an instruction. When the instruction is run on a computer, the computer is enabled to perform the methods in the foregoing aspects.

BRIEF DESCRIPTION OF DRAWINGS

To describe the technical solutions in the embodiments more clearly, the following illustrates the accompanying drawings required for illustration in the embodiments.

FIG. 3d is a schematic diagram of a structure of a SID according to an embodiment;

DESCRIPTION OF EMBODIMENTS

The following describes the embodiments with reference to the accompanying drawings in the embodiments.

Embodiments provide a method for forwarding a packet in a network and a network device based on the method, to replicate a first packet in the network, obtain a plurality of second packets, and forward the plurality of second packets to a same network device over a plurality of different parallel forwarding paths. The network device stores only a second packet that first reaches the network device, and discards a second packet in the plurality of second packets except the second packet that first reaches the network device. This improves reliability of packet forwarding. The method and the network device are based on a same inventive concept. Because the method and the network device resolve problems by using similar principles, cross reference may be made between the implementations of the network device and the method. Repeated parts are not described again.

Figure 1:
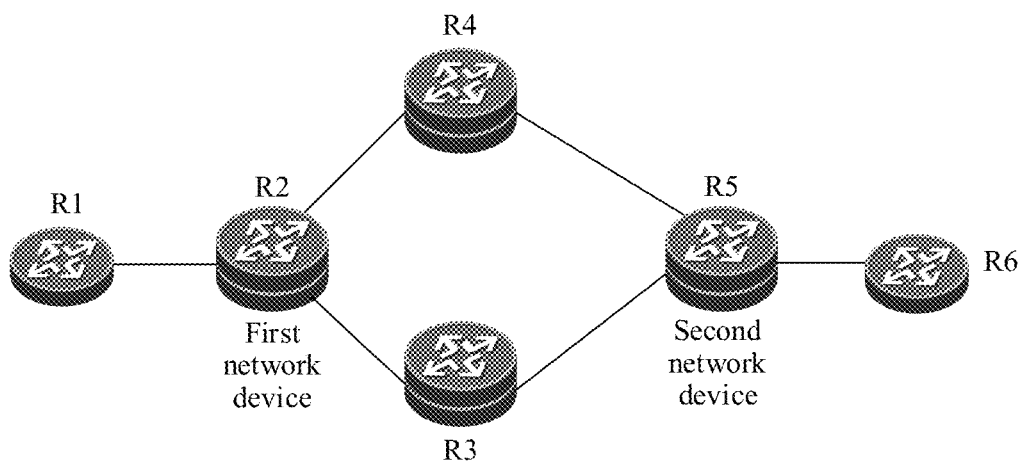
FIG. 1 is a schematic diagram of an application scenario according to an embodiment.

FIG. 1 shows an example application scenario according to an embodiment. In the application scenario, a network device R1, a network device R2, a network device R3, a network device R4, a network device R5, and a network device R6 constitute a physical network. Alternatively, the physical network in this embodiment may include only the network device R2, the network device R3, the network device R4, the network device R5, and the like. An existence form of the physical network is not limited in this embodiment. In some embodiments, the physical network may be a data center network, a wireless network, a deterministic network (DetNet), a segment routing (SR) network, or the like.

A first network device in the embodiments may be the network device R2 in FIG. 1, a second network device may be the network device R5 in FIG. 1, and there are a plurality of forwarding paths between the first network device and the second network device. For example, in a network architecture in FIG. 1, the network device R2 may reach the network device R5 through the network device R3. In addition, the network device R2 may reach the network device R5 through the network device R4. In other words, there are two forwarding paths between the network device R2 and the network device R5. It may be understood that, there may be another forwarding path between the network device R2 and the network device R5. In this embodiment, an example in which there are only two forwarding paths is used for description.

In some embodiments, for one of the forwarding paths, for example, a forwarding path R2-R3-R5, the network device R2 may reach the network device R5 through an intermediate network device (namely, the network device R3 in FIG. 1) used for forwarding. Alternatively, the network device R2 may reach the network device R5 through two or more intermediate network devices used for forwarding. For example, after a packet reaches the network device R3, the network device R3 forwards the packet to a network device R7, and the network device R7 forwards the packet to the network device R5.

The network devices R1 to R6 each may be a router or a switch, or a forwarder in a network architecture of software-defined networking (SDN). In this embodiment, after receiving a first packet, the first network device (for example, R2) generates a plurality of second packets when determining that the first packet includes first indication information used to instruct the first network device to generate the plurality of second packets, and separately forwards the plurality of second packets to the second network device (for example, R5) over different forwarding paths. The second network device stores a second packet that is in the plurality of second packets and that first reaches the second network device, and discards a second packet in the plurality of second packets except the second packet that first reaches the second network device. In the foregoing packet forwarding mode, even if network links of some of the plurality of forwarding paths are faulty, receiving of the second packet by the second network device is not affected. Therefore, this improves reliability of packet forwarding.

Figure 2:
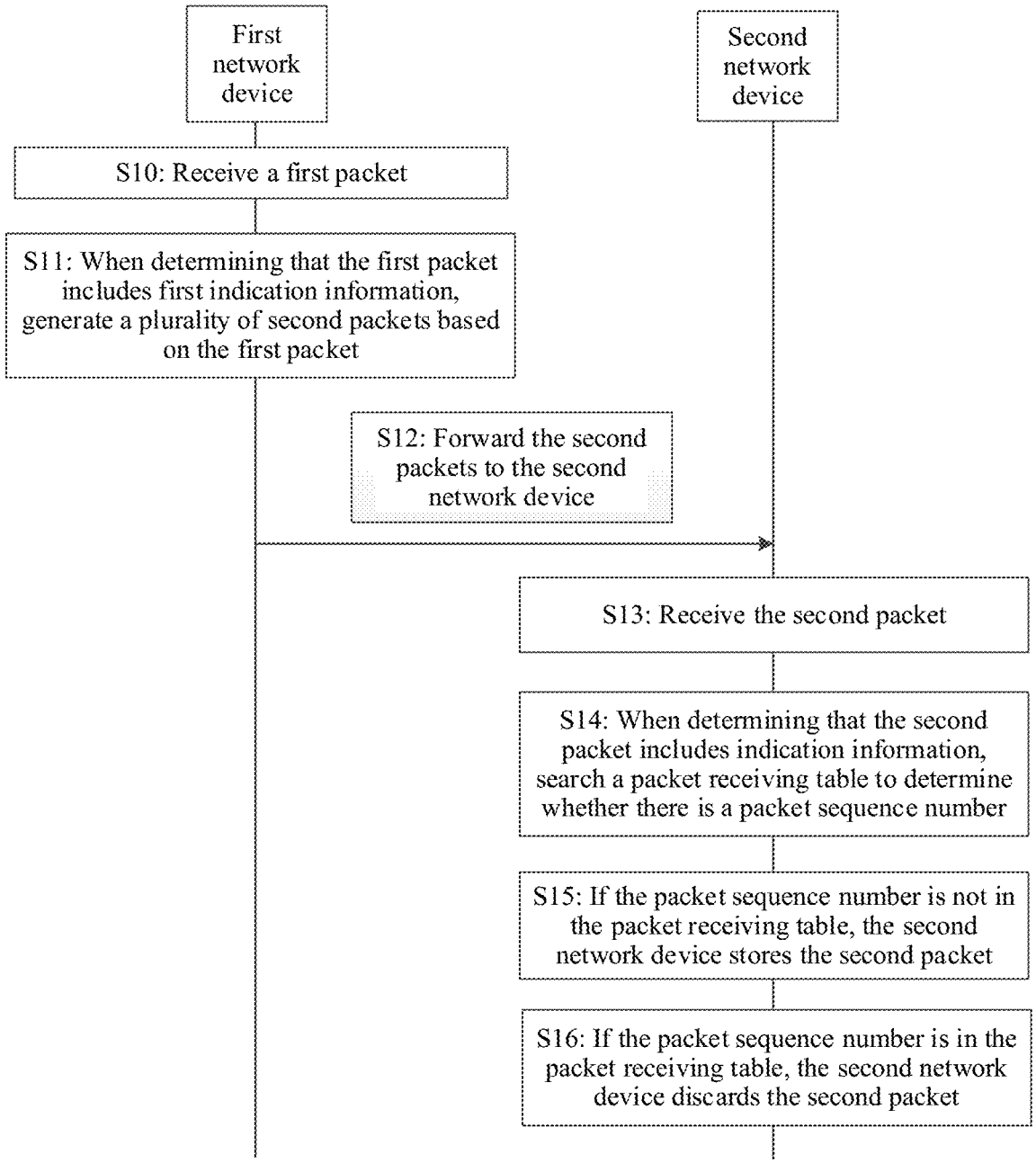
FIG. 2 is a schematic flowchart of a method for forwarding a packet according to an embodiment.

With reference to the application scenario shown in FIG. 1, referring to FIG. 2, an embodiment provides a schematic flowchart of a method for forwarding a packet. The method includes the following steps.

S10: A first network device receives a first packet, where the first packet includes first indication information, payload data, and a packet sequence number of the first packet in a data flow corresponding to the first packet.

In one embodiment, the first indication information is used to instruct the first network device to generate a plurality of second packets based on the first packet. The payload data is user data that needs to be transmitted. The packet sequence number is a number of the first packet in a corresponding data flow. For example, the data flow corresponding to the first packet includes a plurality of packets, and each of the plurality of packets are numbered in a sending sequence. The number may be the packet sequence number. A packet sequence number of a packet is not changed in a process in which the packet is forwarded and re-encapsulated. For example, when the first packet is re-encapsulated to obtain the second packet, the packet sequence number is not changed. In other words, the packet sequence number included in the second packet is the same as the packet sequence number included in the first packet. For another example, when the second packet is received by another network device, and is re-encapsulated to obtain a third packet, the packet sequence number is still not changed. In other words, the packet sequence number included in the third packet is the same as the packet sequence number included in the first packet.

S11: When determining that the first packet includes the first indication information, the first network device generates the plurality of second packets based on the first packet, where each of the plurality of second packets includes the payload data, the packet sequence number, and second indication information.

S12: The first network device separately forwards the plurality of second packets to the second network device over different forwarding paths in a plurality of forwarding paths, where the second indication information is used to instruct the second network device to discard a packet in the plurality of second packets except a packet that first reaches the second network device.

S13: The second network device receives the second packet, where the second packet is any one of the plurality of second packets that are generated by the first network device based on the first packet.

S14: When determining that the second packet includes the second indication information, the second network device searches a packet receiving table to determine whether there is the packet sequence number, where the packet receiving table is used to record a packet sequence number included in the second packet that is in the plurality of second packets and that first reaches the second network device.

515: If the packet sequence number is not in the packet receiving table, the second network device stores the second packet.

S16: If the packet sequence number is in the packet receiving table, the second network device discards the second packet.

In some embodiments, a manner in which the first network device generates the plurality of second packets based on the first packet may be as follows: The first network device replicates the first packet to obtain a plurality of replicated packets, pops information (such as path information and the first indication information that are carried in the first packet) unnecessary for the second packet out from each of the replicated packets, and then pushes information (such as the second indication information, and path information corresponding to the second packet) necessary for the second packet. Alternatively, the first network device pops information (such as path information and the first indication information that are carried in the first packet) unnecessary for the second packet out from the first packet, replicates a packet obtained after pop processing, to obtain a plurality of replicated packets, and pushes information (such as the second indication information, and path information corresponding to the second packet) necessary for the second packet to each of the replicated packets. In some other embodiments, the first network device pops information (such as path information and the first indication information that are carried in the first packet) unnecessary for the second packet out from the first packet, pushes information (such as the second indication information) common to all of the second packets, replicates a packet obtained after push processing, to obtain a plurality of replicated packets, and pushes information (such as path information corresponding to the second packet) unique to each of the replicated packets to the replicated packet. It should be noted that a manner of generating the plurality of second packets by the first network device based on the first packet is not limited to the foregoing three manners. The foregoing three manners are merely examples for description.

It should be noted that the path information corresponding to the second packet refers to path information of a forwarding path corresponding to forwarding of the second packet, and each packet is forwarded over a different forwarding path. Therefore, path information of a forwarding path of each packet is different. For example, one second packet is forwarded over a forwarding path 1, and another second packet is forwarded over a forwarding path 2. In this case, the path information that is of the forwarding path and that is included in the one second packet is path information of the forwarding path 1, and the path information that is of the forwarding path and that is included in the other second packet is path information of the forwarding path 2.

In some embodiments, the path information of the forwarding path corresponding to each packet may be preconfigured in the first network device. After generating the plurality of second packets, the first network device searches a local storage device for path information of a forwarding path corresponding to each second packet. For example, the first network device stores path information of each of the plurality of forwarding paths associated with a flow identifier of the data flow corresponding to the first packet. The first packet may further include the flow identifier of the data flow corresponding to the first packet. When obtaining the flow identifier from the first packet through parsing, the first network device may find path information of the plurality of forwarding paths associated with the flow identifier, and encapsulate path information of each of the plurality of forwarding paths in a corresponding second packet. The second packet may also include the flow identifier, so that the second network device searches, based on the flow identifier, for path information of a forwarding path corresponding to the third packet obtained by re-encapsulating the second packet.

In a first implementation, the first indication information may include a first label, and the second indication information may include a second label. The first label corresponds to a first function, and the first function is used to instruct the first network device to generate the plurality of second packets. For example, the first label is a replication label. The second label corresponds to a second function, and the second function is used to instruct the second network device to discard the packet in the plurality of second packets except the packet that first reaches the second network device. For example, the second label is a redundancy label.

When identifying the first label included at a top of the first packet, the first network device generates the plurality of second packets based on the first packet, and forwards the plurality of second packets to the second network device over different forwarding paths.

Labels corresponding to different functions are encapsulated in a packet, so that the network device identifies the label and performs an operation corresponding to the label. This improves operation efficiency.

In a second implementation, both the first indication information and the second indication information may include a third label, and the third label is used to uniquely identify the data flow corresponding to the first packet. Because the third label may be used to identify the data flow corresponding to the first packet, the flow identifier may not need to be encapsulated in the first packet and the second packet, to reduce packet overheads.

A correspondence between the third label and an operation type needs to be preconfigured in the first network device and the second network device. For example, an operation type corresponding to the third label is configured as a target operation type in the first network device, and the target operation type is used to instruct the first network device to generate the plurality of second packets based on the first packet. In some embodiments, the target operation type is a replication operation type. When receiving the first packet, the first network device obtains, through parsing, that the top of the first packet is the third label, and finds that the target operation type corresponding to the third label is the replication operation type. Therefore, the first network device generates the plurality of second packets based on the first packet. The target operation type corresponding to the third label is configured in the second network device. The target operation type is a deletion operation type that is used to instruct the second network device to discard the packet in the plurality of second packets except the packet that first reaches the second network device.

In the foregoing manner, the third label may be used to identify the data flow corresponding to the packet, and may also be used as different indication information. Therefore, a flow identifier does not need to be additionally encapsulated in the packet. This reduces packet overheads.

In some embodiments, the first label, the second label, and the third label are labels used in an SR network.

In a third optional implementation, the method for forwarding a packet in this embodiment may be applied to an SRv6 network. The first indication information may include first function information corresponding to a first address in a destination address field in an IPv6 header of the first packet. The first function information may be extended function information, and is used to instruct the first network device to generate the plurality of second packets. For example, the first function information is a replication function information. The first address matches a network address of the first network device.

The first network device generates the plurality of second packets based on the first packet, where each of the packets includes the second indication information, path information of a forwarding path corresponding to the packet, the packet sequence number, and the payload data. The second indication information may be second function information corresponding to a second address in an SRH of the second packet, and the second address matches a network address of the second network device. The second function information may be other extended function information, and is used to instruct the second network device to discard another packet in the plurality of second packets except the packet that first reaches the second network device. For example, the second function information is redundancy deletion function information.

Figure 3A:
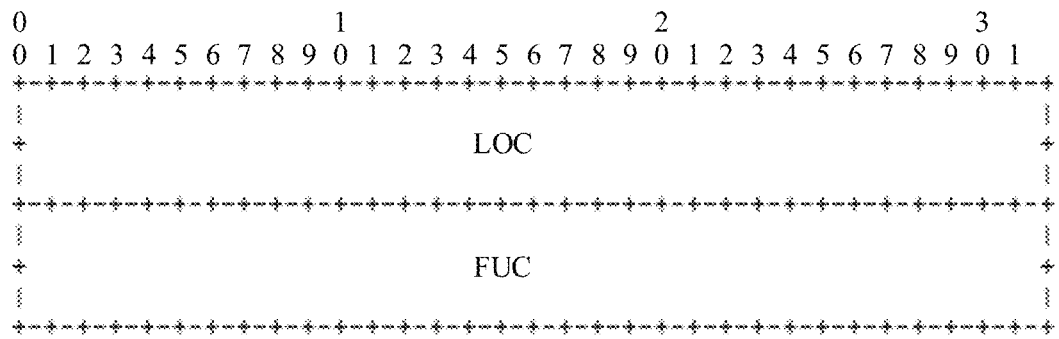
FIG. 3a is a schematic diagram of a structure of a SID according to an embodiment.

As shown in FIG. 3a, a main idea of SRv6 programming is to divide an SRv6 local segment identification (local SID) into two parts: LOC (Local) and FUNCT (Function). Each of the two parts occupies 64 bits. The LOC is usually a network segment address through which a current network device can be routed, and the FUNCT usually corresponds to a specific function of a SID. For example, a current available function of the FUNCT is an Endpoint function.

Figure 3B:
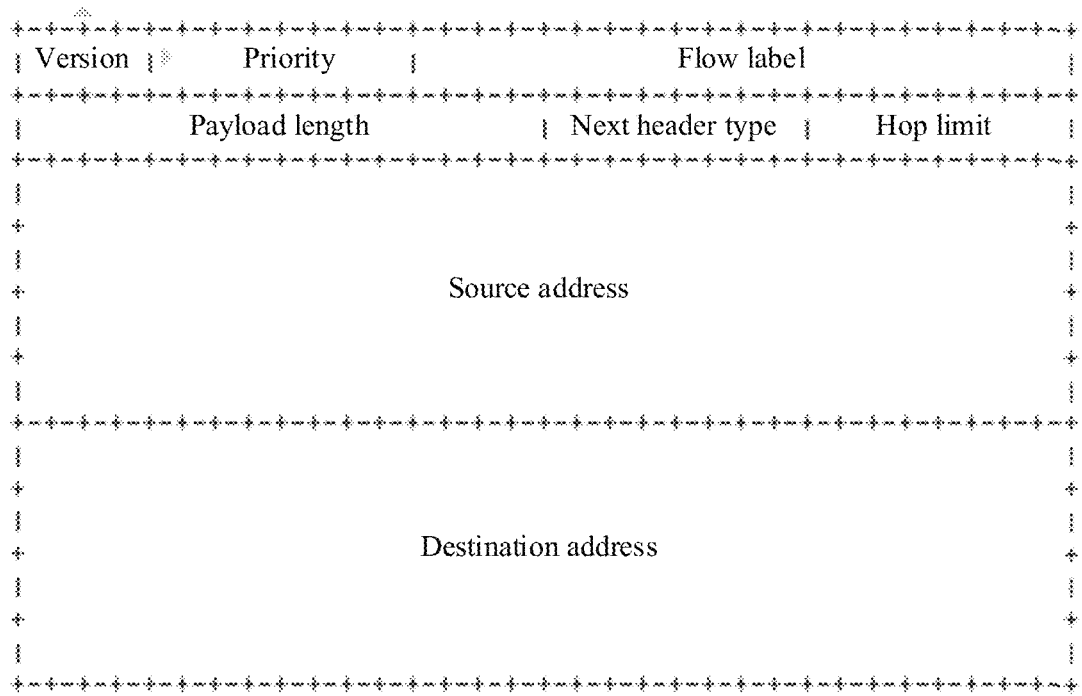
FIG. 3b is a schematic diagram of an IPv6 header according to an embodiment.
Figure 3C:
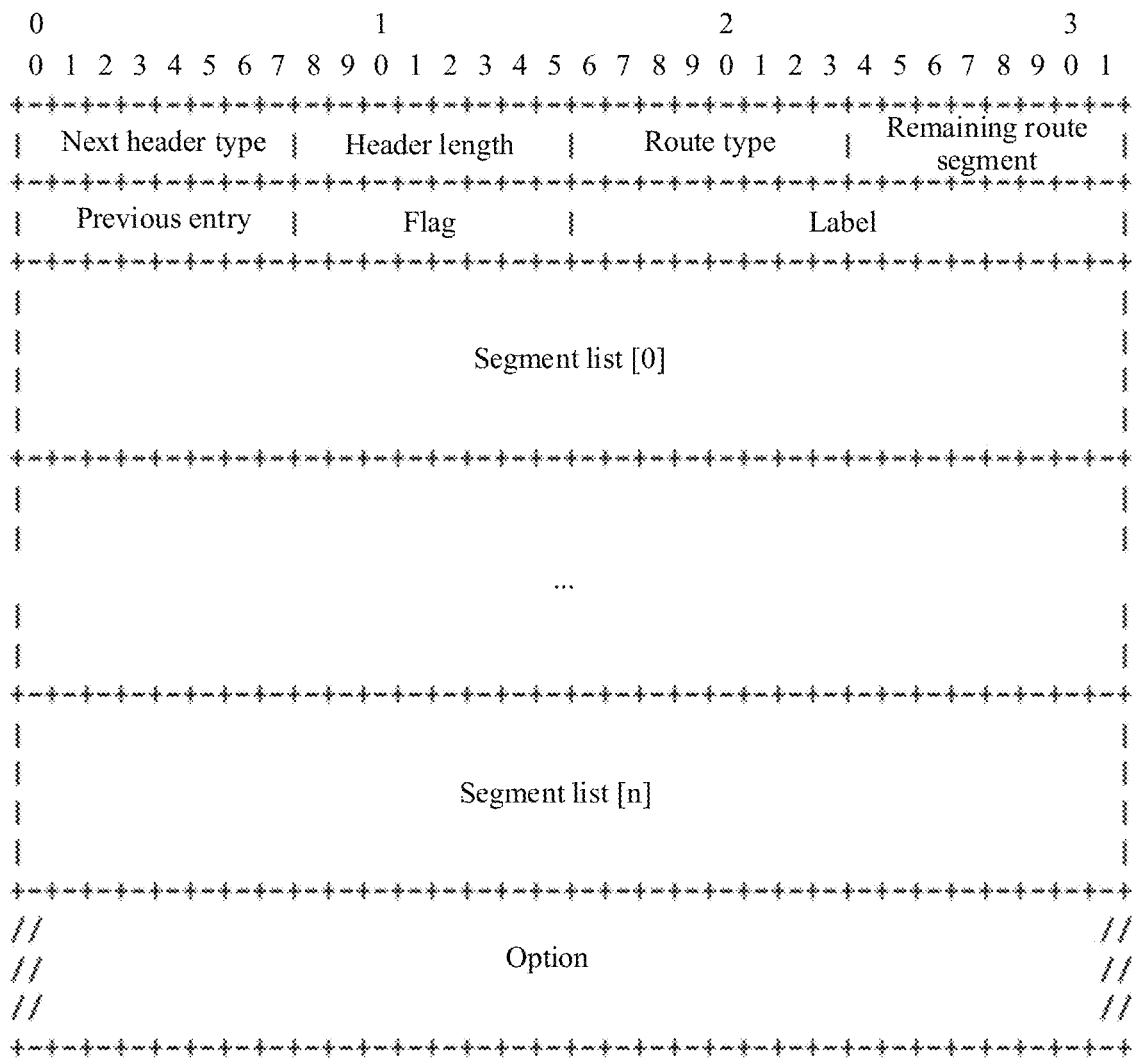
FIG. 3c is a schematic diagram of a structure of an SRH according to an embodiment.

In some embodiments, a structure of an SRv6 packet includes an IPv6 header shown in FIG. 3b and an SRH shown in FIG. 3c. When information carried in a destination address field in an IPv6 header of the packet matches an SRv6 local SID of a network device, and a function of the FUNCT is Endpoint, the network device updates information in the destination address field in the IPv6 header by using a corresponding segment list in the SRH of the structure of the packet, further searches a forwarding table for an updated destination address, and forwards the packet based on a search result; otherwise the network device discards the packet. It should be noted that a format of the destination address field in the IPv6 header is the same as a format of the SRv6 local SID in FIG. 3a, and a format of each segment list in the SRH is the same as the format of the SRv6 local SID in FIG. 3a.

In this embodiment, two types of new function information different from the Endpoint function are extended, that is, the first function information and the second function information. The first function information is used to instruct the first network device to generate the plurality of second packets. For example, the first function information is replication function information. The second function information is used to instruct the second network device to discard the packet in the plurality of second packets except the packet that first reaches the second network device. For example, the second function information is the redundancy deletion function information.

In some embodiments, when the first network device receives the first packet, an address in the destination address field in the packet header of the first packet matches the network address of the first network device, and the first function information in the destination address field is the replication function information, the first network device replicates the first packet. In addition, the first network device obtains the flow identifier of the data flow corresponding to the first packet, and searches for an SRH corresponding to the flow identifier. The SRH includes the second address and the second function information corresponding to the second address, and the second address matches the network address of the second network device. In addition, the SRH includes path information of a forwarding path of the second packet (that is, network addresses of all network devices on the forwarding path). Function information corresponding to another address (that is, a network address of an intermediate network device on the forwarding path) different from the second address in the SRH is Endpoint. In other words, the intermediate network device updates only a destination address field in the SRH of the second packet, and searches the forwarding table for forwarding. The first network device replaces an SRH of the replicated packet with the SRH obtained through searching, and updates the destination address field in the IPv6 header to obtain the second packet.

In some embodiments, if the SID is encapsulated in a manner in FIG. 3a, the first packet and the second packet may further include a DetNet SRv6 header, and the DetNet SRv6 header includes the flow identifier and the packet sequence number. In some embodiments, if the SID is encapsulated in a manner in FIG. 3d, to be specific, the flow identifier and the packet sequence number are used as parameters of function information and encapsulated in the SID, the first packet and the second packet may not include the DetNet SRv6 header. This reduces packet overheads. The FUN occupies 4 bits, a flow ID occupies 28 bits, and a packet sequence number SN occupies 32 bits.

The first function information and the second function information are extended, so that the foregoing method of forwarding a packet can be used in a network supporting an SRv6 protocol. This improves reliability of packet forwarding.

The first network device forwards the plurality of second packets to the second network device over the different forwarding paths in the plurality of forwarding paths between the first network device and the second network device.

The second network device receives the second packets. It should be noted that the second packets received by the second network device may be different from the second packets sent by the first network device. For example, there is at least one intermediate network device on the forwarding path between the first network device and the second network device. The intermediate network device re-encapsulates (for example, pops a corresponding MPLS label out) a received packet, and then forwards the re-encapsulated packet. However, the packet re-encapsulated by the intermediate network device still includes the second indication information, the packet sequence number, the payload data, and the like. Essentially, the packet is the same as the second packet sent by the first network device. Therefore, the packet is generally referred to as the second packet in this embodiment.

FIG. 1 is still used as an example for description herein. There are two forwarding paths between the network device R2 and the network device R5, and a forwarding path R2-R4-R5 is used as an example for description. The network device R2 sends a second packet, and the second packet reaches the network device R4. The network device R4 performs corresponding encapsulation processing (for example, pops a corresponding MPLS label out or updates information in a destination address field in an IPv6 header) on the second packet, and sends a packet that is obtained after encapsulation processing to the network device R5. In this embodiment, the packet received by the network device R5 is still referred to as a second packet, and the second packet is essentially the same as the second packet sent by the network device R2. However, some changes may occur in the packet received by the network device R5 due to processing performed by the intermediate network device R4.

The second network device parses the second packet and searches, when determining that the second packet includes indication information, a packet receiving table to determine whether there is the packet sequence number included in the second packet. In some embodiments, the indication information is used to instruct the second network device to discard a packet in the plurality of second packets, sent by the first network device, except a packet that first reaches the second network device. The indication information is the same as the second indication information included in the second packet sent by the first network device. The packet receiving table is used to record the packet sequence number included in the second packet that first reaches the second network device. For example, each time the second network device receives a packet, the second network device searches the packet receiving table for a packet sequence number included in the packet. If the packet sequence number is in the packet receiving table, it indicates that the second network device has received a packet including the packet sequence number, and the second network device discards the packet. If the packet sequence number is not in the packet receiving table, it indicates that the second network device has not received a packet including the packet sequence number, and the second network device stores the packet. In some embodiments, the second network device may further forward the packet.

In an implementation, the indication information includes a label corresponding to a target function, and the target function is used to instruct the second network device to discard the packet in the plurality of second packets except the packet that first reaches the second network device. The label herein is the same as the second label included in the second packet sent by the first network device in the first optional implementation described above. A target function corresponding to the label herein is the same as the second function corresponding to the second label, and details are not described herein. When identifying the label included at the top of the second packet, the second network device stores the second packet that first reaches the second network device and discards the packet in the plurality of second packets except the packet that first reaches the second network device.

The label corresponding to the target function is encapsulated in the second packet, so that the second network device identifies the label and performs an operation corresponding to the label. This improves operation efficiency.

In another implementation, the indication information may include a label, and the label is used to identify a data flow corresponding to the first packet. The label herein is the same as the third label included in the second packet sent by the first network device in the second optional implementation described above, and details are not described herein. It should be noted that a correspondence between the label and an operation type needs to be configured in the second network device. When finding that the operation type corresponding to the label is a target operation type, the second network device searches the packet receiving table to determine whether there is the packet sequence number included in the second packet. The target operation type is used to instruct the second network device to discard the packet in the plurality of second packets, sent by the first network device, except the packet that first reaches the second network device.

In the foregoing manner, the label may not only be used to identify a data flow corresponding to a packet, but also be used as different indication information. Therefore, a flow identifier does not need to be additionally encapsulated in the packet. This reduces packet overheads.

In still another implementation, the indication information may include target function information corresponding to a destination address in a destination address field in an IPv6 header of the second packet, and the destination address matches a network address of the second network device. The target function information is used to instruct the second network device to discard the packet in the plurality of second packets, sent by the first network device, except the packet that first reaches the second network device. For a format of the IPv6 header of the second packet, refer to the foregoing third optional implementation. Details are not described herein.

It should be noted that, there may be an intermediate network device used for forwarding between the first network device and the second network device. In a forwarding process, the intermediate network device updates, based on an SRH included in the second packet sent by the first network device, the IPv6 header of the second packet sent by the first network device. Therefore, the second packet received by the second network device differs from the second packet sent by the first network device in the IPv6 header. Information in the IPv6 header in the second packet is the same as the second indication information included in the SRH of the second packet sent by the first network device.

In some embodiments, the network further includes a third network device, and there is at least one forwarding path between the second network device and the third network device. When not finding, in the packet receiving table, the packet sequence number included in the received second packet, the second network device searches for path information of a forwarding path corresponding to a flow identifier included in the second packet, encapsulates the path information in the second packet to obtain a third packet, and forwards the third packet obtained after encapsulation to the third network device. The path information may include the MPLS label stack and the SRH described in the foregoing embodiment.

The target function information is extended, so that the foregoing method of forwarding a packet can be used in a network supporting an SRv6 protocol. This improves reliability of packet forwarding.

The following describes the foregoing embodiments by using examples with reference to FIG. 4 to FIG. 7A and FIG. 7B. In FIG. 4 to FIG. 7A and FIG. 7B, a flow identifier is briefly referred to as a flow ID, and a packet sequence number is briefly referred to as an SN.

Figure 4:
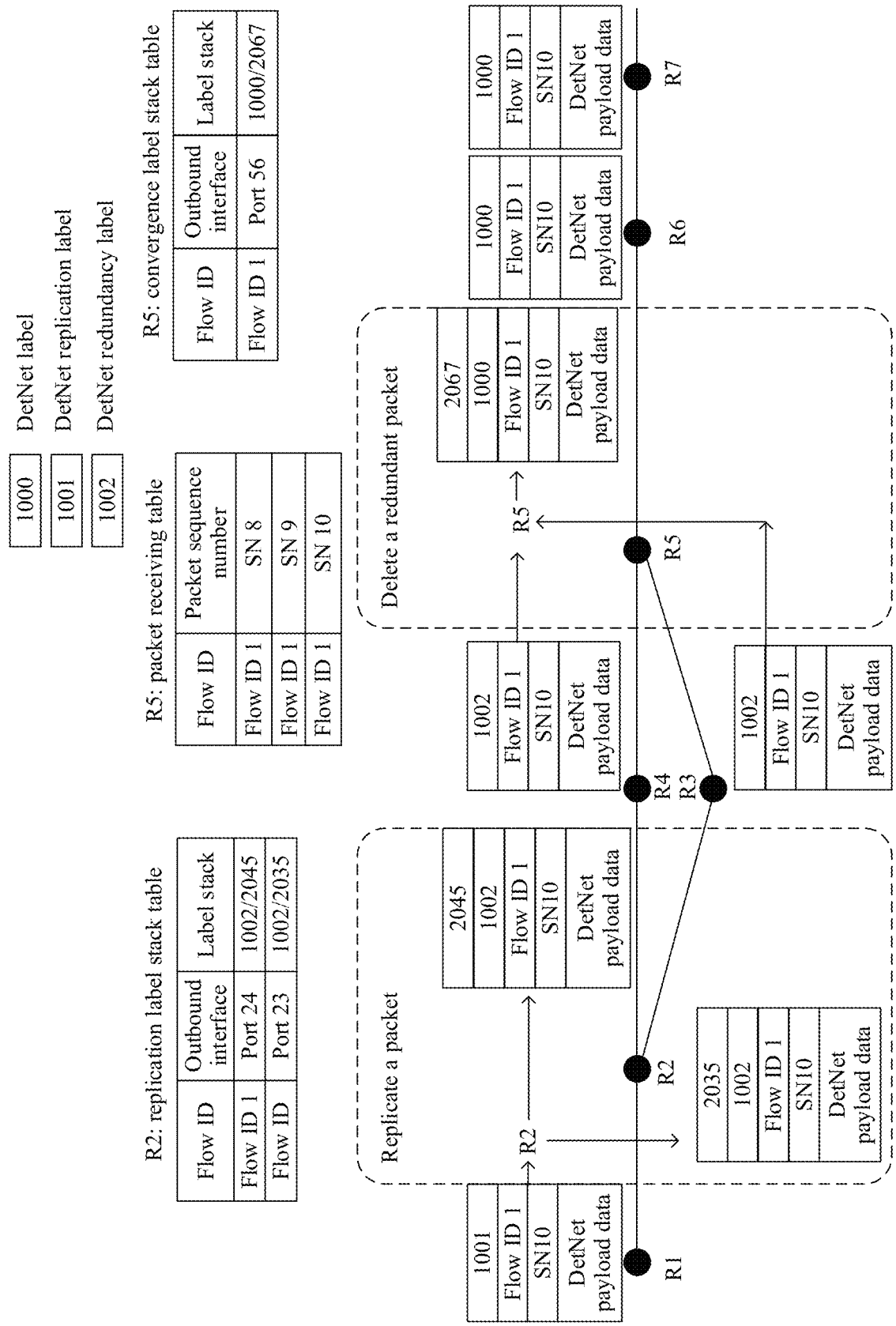
FIG. 4 is a diagram of a scenario in which a packet is forwarded according to an embodiment.

In some embodiments, with reference to a scenario in FIG. 4, an example is used for describing that the first indication information includes a first label and the foregoing second indication information includes a second label in the foregoing description. As shown in FIG. 4, the scenario may be a packet forwarding scenario in an MPLS segment routing (SR) network, and payload data may be DetNet payload data. Two fields are extended at a bottom of an SR label stack to form a DetNet header (DetNet MPLS Segment Routing Encapsulation Header). The two fields include the flow identifier (Flow ID) and the packet sequence number (SN). In addition, three SR labels with special meanings, namely, a replication label, a redundancy label, and a DetNet label, are defined.

The replication label is used as an instruction for replicating a packet. When a top of a DetNet packet received by a network device is the replication label, the network device replicates the packet, and pushes a corresponding label stack (for example, a redundancy label and an MPLS label stack) to the packet. A DetNet redundancy label is used as an instruction for deleting a redundant packet. When a top of a received DetNet packet is the redundancy label, a flow ID and a sequence Num of the packet are searched for, a packet that is first received is stored, and the redundant packet is discarded. If the packet needs to be further forwarded, a corresponding label stack (for example, a DetNet label and an MPLS label stack) is added to the packet before the packet is forwarded. Then, forwarding is performed. The DetNet label is used to mark that a transmitted packet belongs to a DetNet data flow. The DetNet label has the DetNet header. The first label mentioned in this embodiment may be the foregoing replication label, and the second label may be the foregoing redundancy label.

A replication label stack table is configured in a first network device. The replication label stack table is used to describe an association relationship between the flow ID and path information (MPLS label stacks) of a plurality of forwarding paths corresponding to a plurality of second packets, and is used to push a new MPLS label stack to the second packet. The new MPLS label stack is used to indicate a forwarding path of the second packet. A convergence label stack table and a packet receiving table are configured in a second network device. The convergence label stack table is used to describe an association relationship between the flow ID and path information of a forwarding path corresponding to a third packet, and the third packet is a packet obtained after re-encapsulation is performed on a second packet that first reaches the second network device. The convergence label stack table is used to push a new MPLS label stack to the third packet, and the new MPLS label stack is used to indicate a forwarding path of the third packet. It should be noted that if the second network device does not further forward the second packet to another network device, the convergence label stack table does not need to be configured in the second network device. The packet receiving table is used to record a flow ID and a sequence Num. If a packet corresponding to a specific sequence number has been received by the second network device, the second network device records the sequence number in the packet receiving table. If the packet corresponding to the sequence number reaches the second network device again, the second network device discards the packet. The second network device may filter, based on the packet receiving table, the plurality of second packets sent by the first network device, and store or forward only the second packet that first reaches the second network device.

Referring to FIG. 4, the first network device is R2, and the second network device is R5. The network device R1 receives a DetNet packet, and encapsulates the DetNet packet, to be specific, encapsulates an input stream ID 1, an SN 10, and a replication label 1001 in the DetNet packet, to obtain a first packet. If there is a multihop route between the network device R1 and the network device R2, an MPLS label stack used to indicate a forwarding path of the first packet needs to be further encapsulated in the packet. The network device R2 receives the first packet sent by the network device R1, parses the first packet, and determines that a top of a label stack of the first packet is a replication label 1001. Therefore, the network device R2 replicates the first packet, pops the replication label 1001 out, and pushes a new label stack to obtain two second packets. The new label stack includes a redundancy label 1002 and an MPLS label stack that is used to indicate a forwarding path of the second packet, where the redundancy label 1002 is located at a bottom of the MPLS label stack.

The network device R2 separately sends the obtained two second packets to a network device R3 and a network device R4. After receiving the second packets, the network device R3 and the network device R4 forward the second packets based on an MPLS label at a top of a label stack of the second packet. The network device R5 receives the packets that have a sequence Num of 10 and that are separately transmitted from the network device R4 and the network device R3. For example, if the packet from the network device R4 first arrives, the network device R5 updates the packet receiving table and pushes new label stacks including a DetNet label and an MPLS label stack that indicates a subsequent forwarding path. Then, when the packet from the network device R3 arrives, R5 searches and determines that the packet sequence number SN10 is in the packet receiving table, and therefore discards the packet forwarded by the network device R3. A packet sent by the network device R5 is finally transmitted to a network device R7, and the network device R7 performs decapsulation and obtains the payload data.

Figure 5:
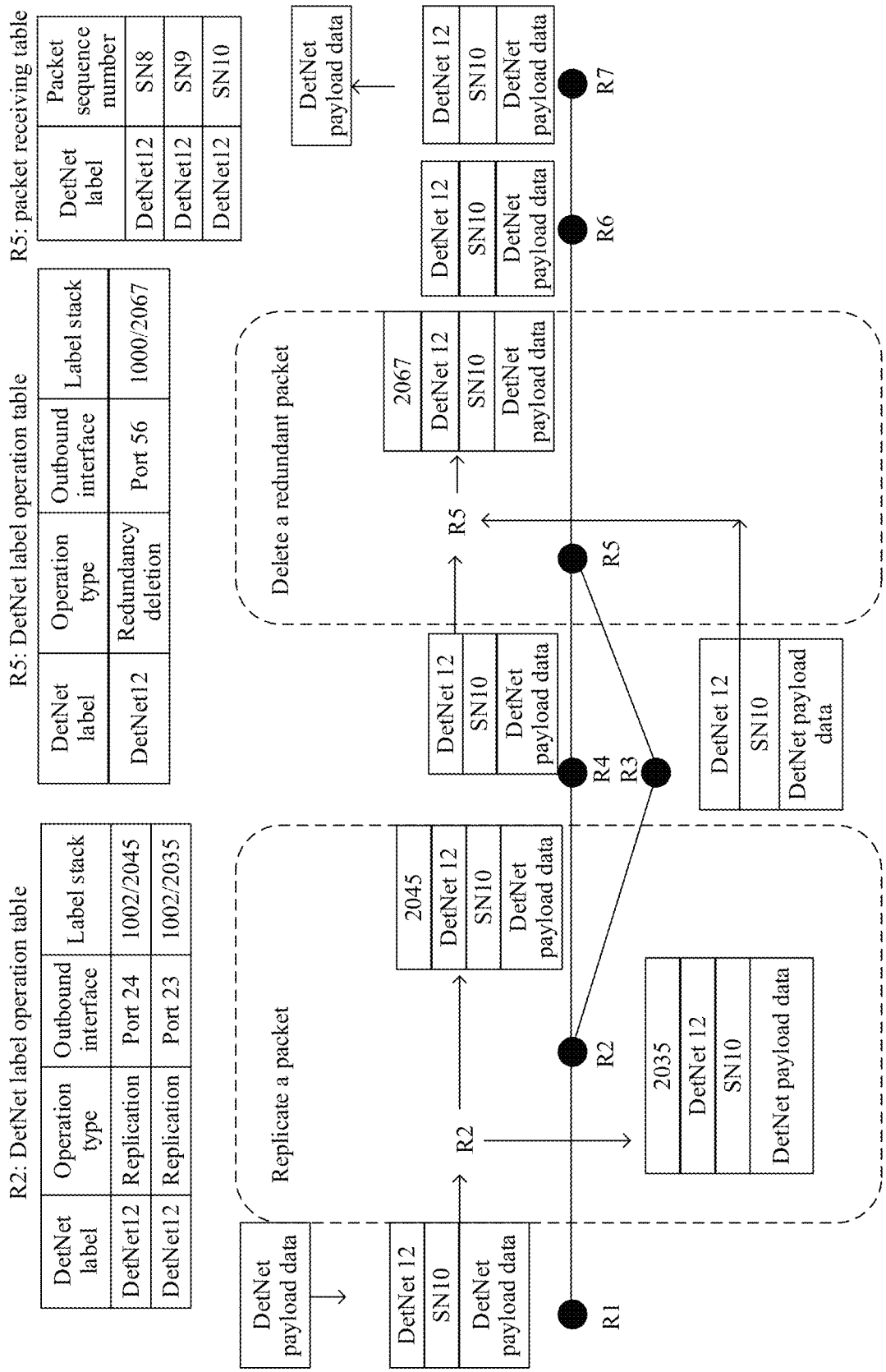
FIG. 5 is a diagram of another scenario in which a packet is forwarded according to an embodiment.

In some embodiments, with reference to a scenario in FIG. 5, an example is used for describing that both the foregoing first indication information and the foregoing second indication information are third labels. As shown in FIG. 5, the scenario may be a packet forwarding scenario according to an MPLS SR protocol. Payload data may be DetNet payload data. A field of a packet sequence number (SN) is extended at a bottom of an SR label stack. In addition, a DetNet SR label (that is, the third label) is defined, and the DetNet SR label is in a one-to-one correspondence with data flow. A first network device and a second network device determine, by identifying a DetNet SR label, an operation type of an operation performed on the packet. The first network device may be a network device R2 in FIG. 5, and the second network device may be a network device R5 in FIG. 5.

A DetNet SR label operation table is configured in the first network device and the second network device. The label operation table is used to describe an operation type corresponding to a DetNet SR label. For example, in the first network device, the operation type that corresponds to the DetNet SR label and that is described in the label operation table is a replication operation. In the second network device, the operation type that corresponds to the DetNet SR label and that is described in the label operation table is a redundancy deletion operation. In addition, the second network device configures the packet receiving table. For a description of the packet receiving table, refer to the description in FIG. 4. FIG. 5 uses a DetNet SR label to replace the flow ID in FIG. 4, and details are not described herein.

Referring to FIG. 5, the network device R1 receives a DetNet packet, and encapsulates the DetNet packet, to be specific, encapsulates an SN 10 and a DetNet12 (that is, the DetNet SR label) in the DetNet packet, to obtain a first packet. If there is a multihop route between the network device R1 and the network device R2, an MPLS label stack used to indicate a forwarding path of the first packet needs to be further encapsulated in the packet. The network device R2 receives the first packet sent by the network device R1, parses the first packet, obtains the DetNet12 label included in the first packet, and searches the label operation table for a target operation type corresponding to the DetNet12. If the target operation type instructs to perform a replication operation on the first packet, the network device R2 replicates the first packet and pushes a new label stack to obtain two second packets. The new label stack includes an MPLS label stack that is used to indicate a forwarding path of the second packet.

The network device R2 separately sends the obtained two second packets to a network device R3 and a network device R4. After receiving the second packets, the network device R3 and the network device R4 forward the second packets based on an MPLS label at a top of a label stack of the second packet. The network device R5 receives the packets separately transmitted from the network device R4 and the network device R3, searches the DetNet label operation table, and finds that the target operation type corresponding to the DetNet12 label is redundancy deletion. Therefore, the network device R5 forwards a packet that is first received, and discards a packet that is repeatedly received. For a specific operation process of the network device R5, refer to the description in FIG. 4. Details are not described herein.

In some embodiments, with reference to scenarios in FIG. 6A and FIG. 6B and FIG. 7A and FIG. 7B, examples are used for describing that the foregoing first indication information includes first function information in a destination address field in an IPv6 header of a first packet and the foregoing second indication information includes second function information in an SRH of a second packet. As shown in FIG. 6A and FIG. 6B and FIG. 7A and FIG. 7B, the scenarios may be packet forwarding scenarios according to an SRv6 protocol, and payload data may be DetNet payload data. A first network device may be a network device R2 and a second network device may be a network device R5.

A packet SRH replication table is configured in the first network device. The packet SRH replication table is used to describe a correspondence between a flow identifier and a plurality of SRHs, and is used to encapsulate a new SRH in a replicated packet, to obtain the second packet. A redundant packet SRH deletion table is configured in the second network device. The redundant packet SRH deletion table is used to describe a correspondence between a flow identifier and a plurality of SRHs, and is used to encapsulate a new SRH in a second packet that is first received by the second network device. Further, a packet receiving table is configured in the second network device, and is used to record a packet sequence number included in the second packet that first reaches the second network device.

In addition, two types of function information are extended, that is, replication function information and redundancy deletion function information. The replication function information: When a network device receives an SRv6 packet, a destination address in an IPv6 header of the packet matches a network address of the network device, and function information corresponding to the destination address is the replication function information, the network device replicates the packet, obtains a flow identifier, and searches the packet SRH replication table for an SRH corresponding to the flow identifier. Then, the network device replaces an SRH of the replicated packet with the SRH that corresponds to the flow identifier and that is in the table, updates the destination address field in the IPv6 header to obtain the second packet, and forwards the packet based on the information in a destination address field in an IPv6 header of the second packet.

The redundancy deletion function information: When a network device receives an SRv6 packet, a destination address in an IPv6 header of the packet matches a network address of the network device, and function information corresponding to the destination address is the redundancy deletion function information, the network device obtains a flow identifier and a packet sequence number, searches a packet receiving table to determine whether there is the packet sequence number, and discards the packet if the sequence number of the packet is in the packet receiving table. If the packet sequence number is not in the packet receiving table, the network device searches the redundant packet SRH deletion table, replaces an SRH of the received packet with an SRH that corresponds to the flow identifier and that is in the redundant packet SRH deletion table, updates a destination address field in the IPv6 header, and forwards the packet based on information in the destination address field.

Figure 6A:
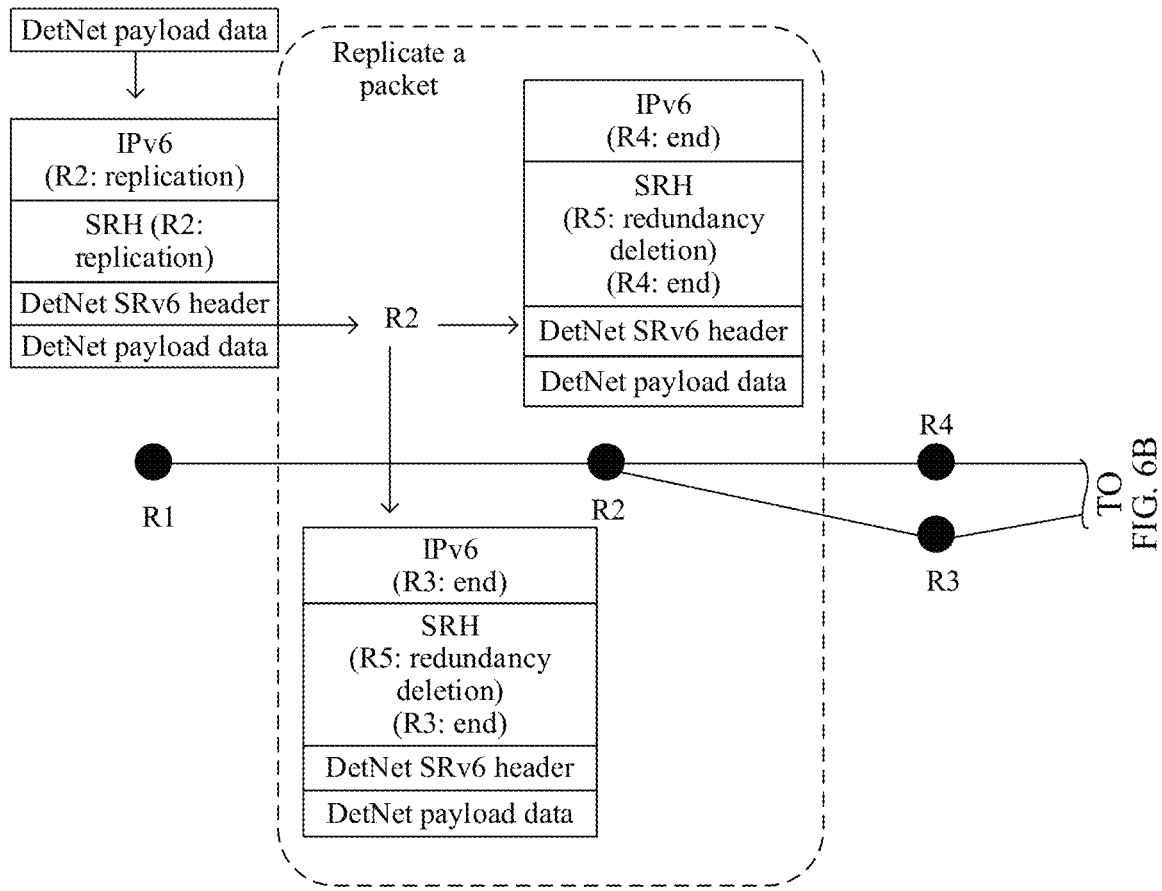
FIG. 6A and FIG. 6B are a diagram of still another scenario in which a packet is forwarded according to an embodiment.
Figure 6B:
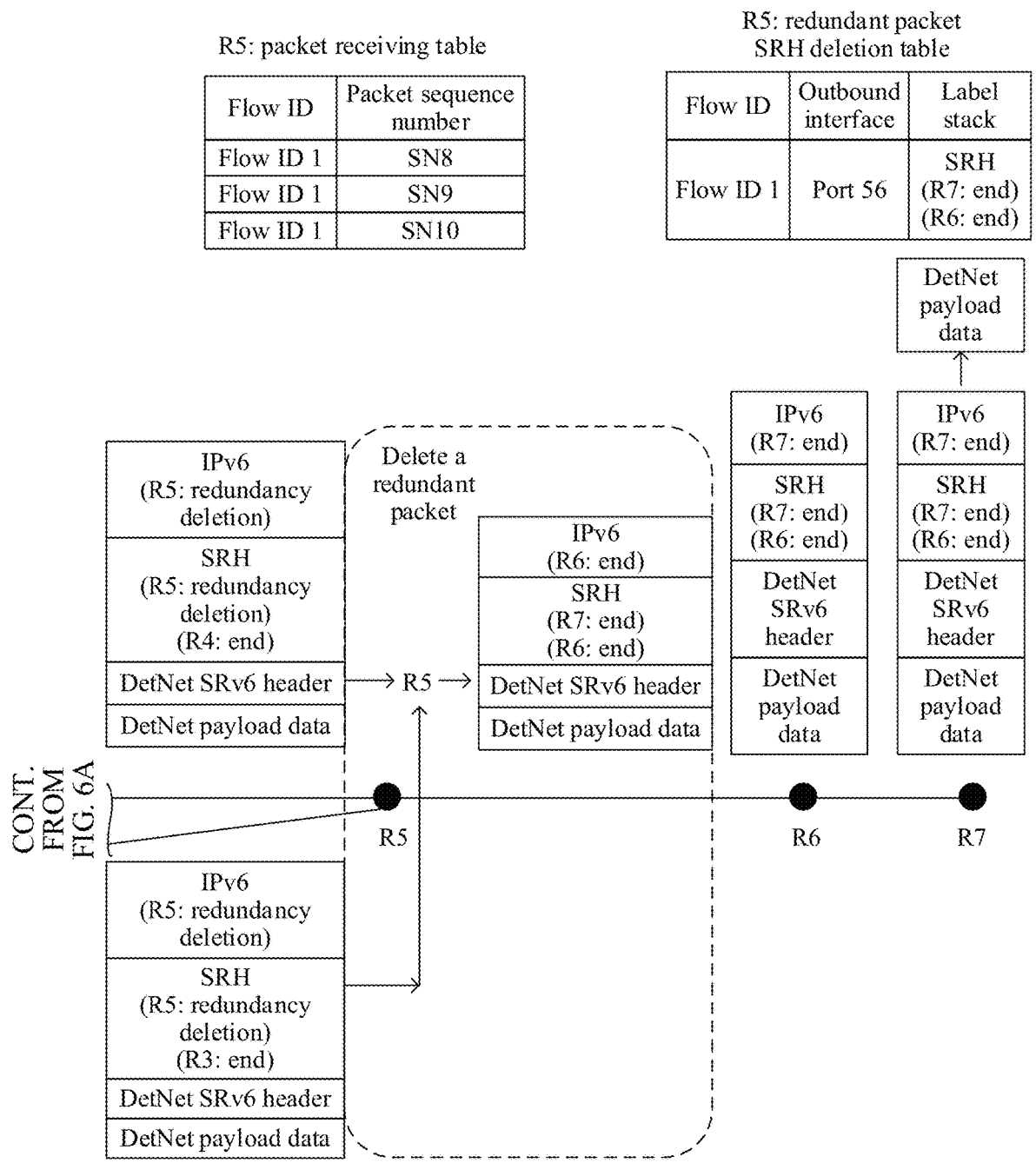

The flow identifier and the packet sequence number may be encapsulated in a DetNet SRv6 header of the packet. In other words, the DetNet SRv6 header includes the flow identifier and the packet sequence number. Referring to FIG. 6A and FIG. 6B, a network device R1 encapsulates a packet, adds the DetNet SRv6 header, an SRH and an IPv6 header, to obtain a first packet. The network device R2 receives the first packet, parses the first packet, and determines that a destination address in the IPv6 header of the first packet matches a network address of the network device R2 and function information corresponding to the destination address in the IPv6 header is a replication function. In this case, the network device R2 replicates the packet. The network device R2 obtains a flow identifier and a packet sequence number from the DetNet SRv6 header, searches the packet SRH replication table for a corresponding SRH, replaces an SRH of the replicated packet with the searched SRH, and updates the IPv6 header of the replicated packet, to obtain a second packet.

The network device R2 separately sends the obtained two second packets to a network device R3 and a network device R4. Because function information corresponding to the network device R3 and the network device R4 is Endpoint, the network device R3 and the network device R4 each only updates a destination address field in an IPv6 header of the packet based on the SRH of the packet, and forwards the packet. In some embodiments, a manner of updating the destination address field of the packet based on the SRH of the packet may be specifically replacing information in the destination address field with a corresponding segment list in the SRH.

The network device R5 receives the packets that have a sequence Num of 10 and that are separately transmitted from the network device R4 and the network device R3. For example, if the packet from the network device R4 first arrives, and the network device R5 determines that a destination address in a destination address field of the packet matches a network address of the network device R5 and function information corresponding to the destination address is the redundancy deletion function information, the network device R5 searches and determines that the packet sequence number is not in the packet receiving table. In this case, the network device R5 updates the packet receiving table, replaces an SRH of the received packet based on the redundant packet SRH deletion table, updates an IPv6 header of the packet, and forwards the packet. Then, when the packet from the network device R3 arrives, R5 searches and determines that the packet sequence number SN10 is in the packet receiving table, and therefore discards the packet forwarded by the network device R3. At last, the packet sent by the network device R5 is transmitted to a network device R7, and the network device R7 performs decapsulation and obtains the payload data.

Figure 7A:
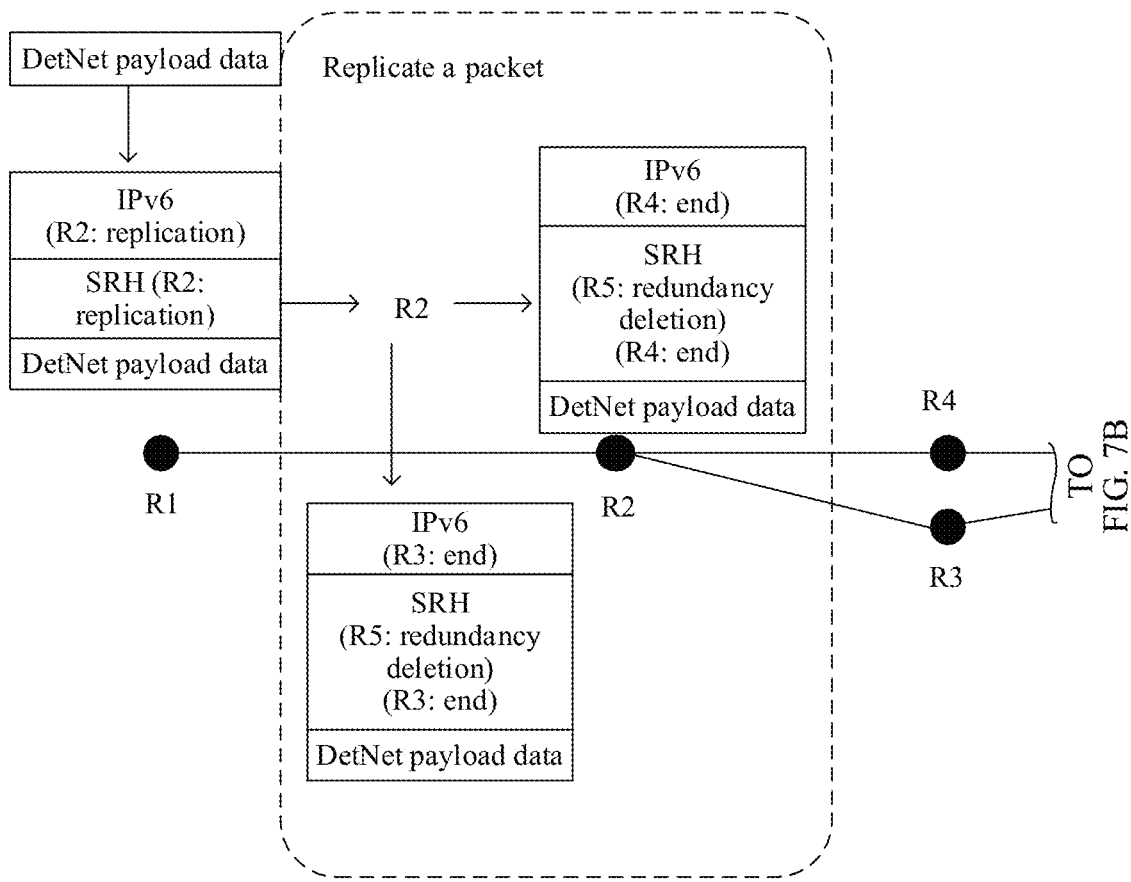
FIG. 7A and FIG. 7B are a diagram of still another scenario in which a packet is forwarded according to an embodiment.
Figure 7B:
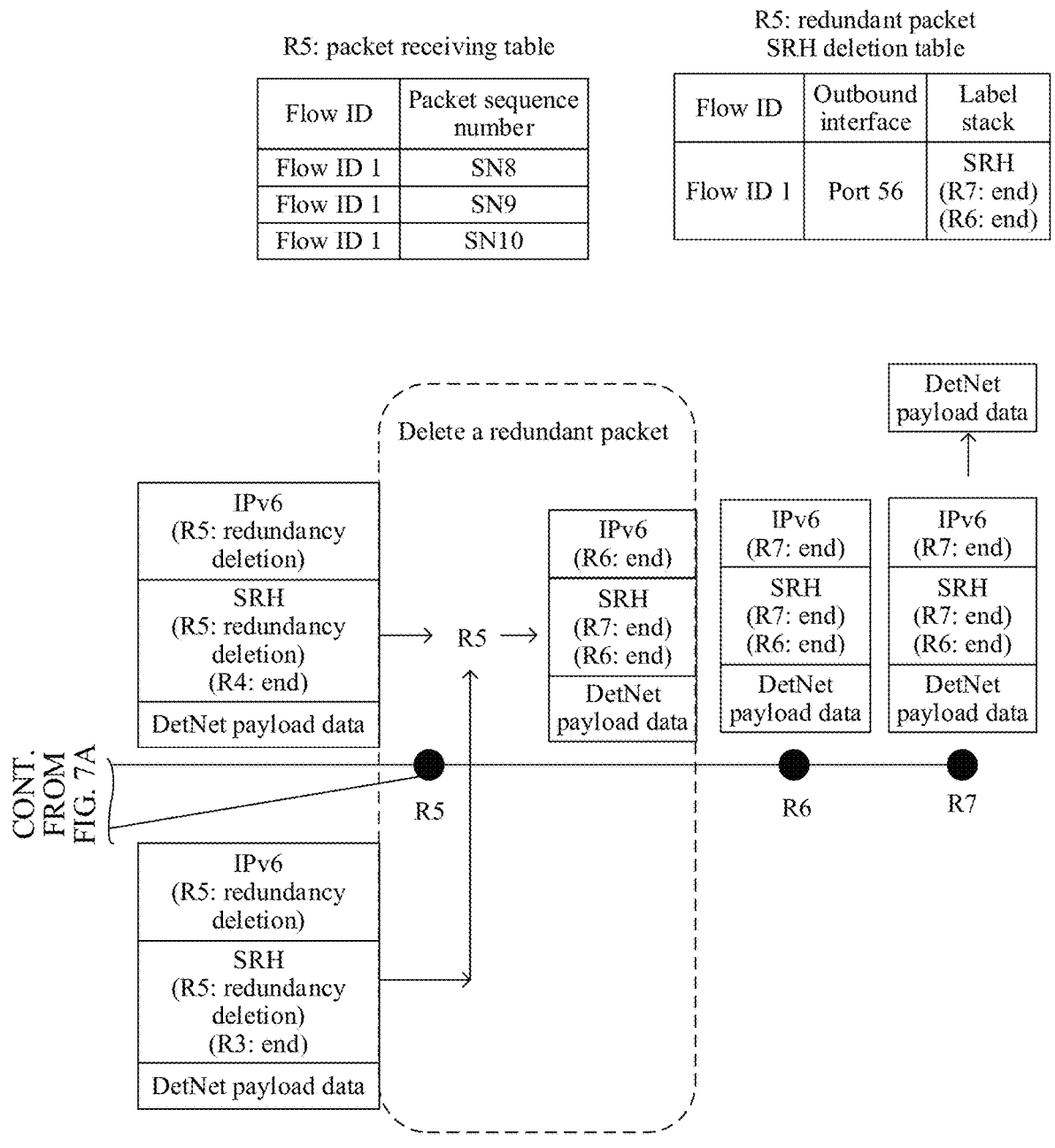

The flow identifier and the packet sequence number may further be encapsulated in an SRH. In other words, a segment list is encapsulated in the format shown in FIG. 3d. As shown in FIG. 7A and FIG. 7B, a difference between an encapsulation structure of each packet and an encapsulation structure in FIG. 6A and FIG. 6B lies in that a DetNet SRv6 header does not need to be added. An operation manner of each network device is the same as that in the embodiment in FIG. 6A and FIG. 6B. Details are not described herein.

Figure 8:
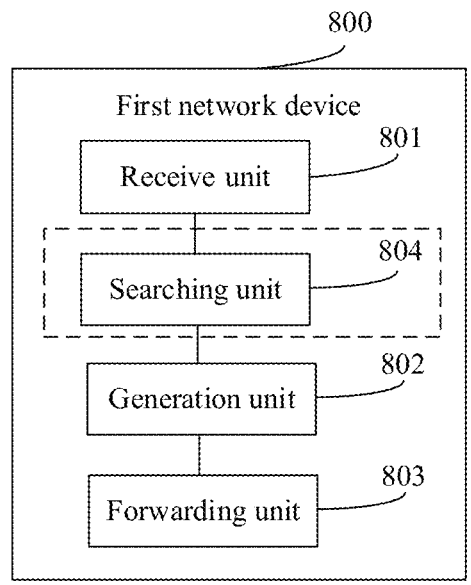
FIG. 8 is a schematic diagram of a structure of a first network device according to an embodiment.

Referring to FIG. 8, an embodiment provides a first network device 800 for forwarding a packet in a network. The network includes the first network device and a second network device, and there are a plurality of forwarding paths between the first network device and the second network device. The first network device includes a receive unit 801, a generation unit 802, a forwarding unit 803, and a searching unit 804.

The receive unit 801 is configured to receive a first packet, where the first packet includes first indication information, payload data, and a packet sequence number of the first packet in a data flow corresponding to the first packet.

The generation unit 802 is configured to generate, when the first network device determines that the first packet comprises the first indication information, a plurality of second packets based on the first packet, where each of the plurality of second packets includes the payload data, the packet sequence number, and second indication information.

The forwarding unit 803 is configured to separately forward the plurality of second packets to the second network device over different forwarding paths in the plurality of forwarding paths, where the second indication information is used to instruct the second network device to discard a packet in the plurality of second packets except a packet that first reaches the second network device.

In an example implementation, the first packet further includes a flow identifier of the data flow corresponding to the first packet, and the first network device further includes the searching unit 804.

The searching unit 804 is configured to search for path information of each of the plurality of forwarding paths associated with the flow identifier, where one second packet corresponds to one of the plurality of forwarding paths.

In an example implementation, the first indication information includes a first label, the second indication information includes a second label, the first label corresponds to a first function, the second label corresponds to a second function, the first function is used to instruct the first network device to generate the plurality of second packets, and the second function is used to instruct the second network device to discard the packet in the plurality of second packets except the packet that first reaches the second network device.

The path information of the forwarding path includes a multi-protocol label switching MPLS label stack of the forwarding path.

In an example implementation, the first indication information includes a third label, the second indication information includes the third label, and the third label is used to identify the data flow corresponding to the first packet.

The path information of the forwarding path includes an MPLS label stack of the forwarding path.

The searching unit 804 is further configured to search for an operation type corresponding to the third label.

The generation unit 802 is configured to: if the operation type corresponding to the third label is a target operation type, generate the plurality of second packets based on the first packet, where the target operation type is used to instruct the first network device to generate the plurality of second packets.

In an example implementation, the first indication information includes first function information corresponding to a first address in a destination address field in an Internet Protocol version 6 IPv6 header of the first packet, and the first address matches a network address of the first network device.

The second packet includes a segment routing header SRH, the SRH includes the second indication information and path information of a forwarding path corresponding to the second packet, the second indication information includes second function information corresponding to a second address of a target segment list in the SRH, and the second address matches a network address of the second network device.

In an example implementation, the flow identifier and the packet sequence number are encapsulated in a segment list in the SRH.

In some embodiments, the second packet further includes an IPv6-based segment routing protocol SRv6 header, and the flow identifier and the packet sequence number are encapsulated in the SRv6 header.

The first network device 800 may be a router, a switch, or a network device having a forwarding function. The first network device 800 can implement functions of the first network device in the foregoing embodiment. For a specific execution step, refer to the foregoing method embodiment. Details are not described herein.

Figure 9:
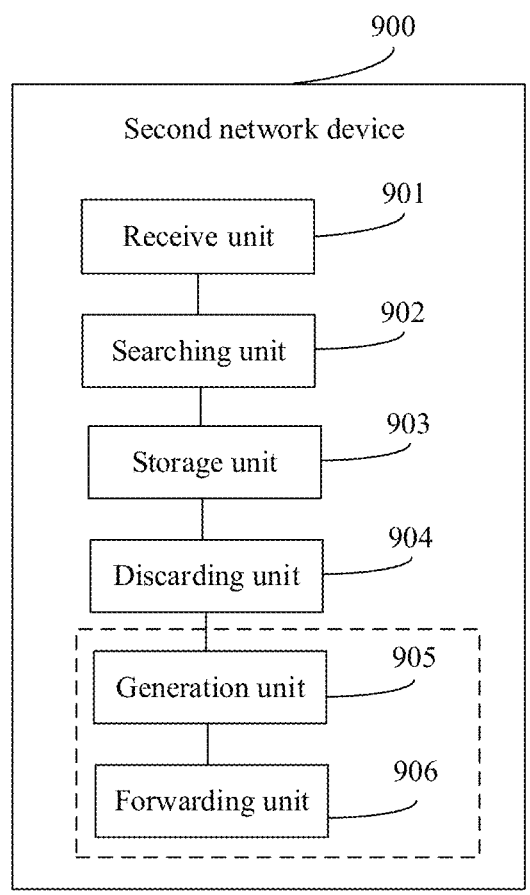
FIG. 9 is a schematic diagram of a structure of a second network device according to an embodiment.

Referring to FIG. 9, an embodiment provides a second network device 900 for forwarding a packet in a network. The network includes a first network device and the second network device, and there are a plurality of forwarding paths between the first network device and the second network device. The second network device includes a receive unit 901, a searching unit 902, a storage unit 903, and a discarding unit 904.

The receive unit 901 is configured to receive a second packet, where the second packet is any one of a plurality of second packets that are generated by the first network device based on a first packet, the second packet includes indication information, payload data carried in the first packet, and a packet sequence number of the first packet in a data flow corresponding to the first packet.

The searching unit 902 is configured to: when the second network device determines that the second packet includes the indication information, search a packet receiving table to determine whether there is the packet sequence number, where the packet receiving table is used to record a packet sequence number included in a second packet that is in the plurality of second packets and that first reaches the second network device.

The storage unit 903 is configured to: if the packet sequence number is not in the packet receiving table, store the second packet.

The discarding unit 904 is configured to: if the packet sequence number is in the packet receiving table, discard the second packet.

In an example implementation, the indication information includes a label corresponding to a target function, and the target function is used to instruct the second network device to discard a packet in the plurality of second packets except the packet that first reaches the second network device.

In an example implementation, the indication information includes a label, and the label is used to identify the data flow corresponding to the first packet.

The searching unit 902 is specifically configured to: if an operation type corresponding to the label is a target operation type, search the packet receiving table to determine whether there is the packet sequence number, where the target operation type is used to instruct the second network device to discard the packet in the plurality of second packets except the packet that first reaches the second network device.

In an example implementation, the indication information includes target function information corresponding to a destination address in a destination address field in an Internet Protocol version 6 IPv6 header of the second packet, and the destination address matches a network address of the second network device.

In an example implementation, the network further includes a third network device, and the second network device further includes a generation unit 905 and a forwarding unit 906.

The generation unit 905 is configured to generate a third packet based on the second packet, where the third packet includes the payload data and the packet sequence number.

The forwarding unit 906 is configured to forward the third packet to the third network device.

The second network device 900 may be a router, a switch, or a network device having a forwarding function. The second network device can implement functions of the second network device in the foregoing embodiment. For a specific execution step, refer to the foregoing method embodiment. Details are not described herein.

Figure 10:
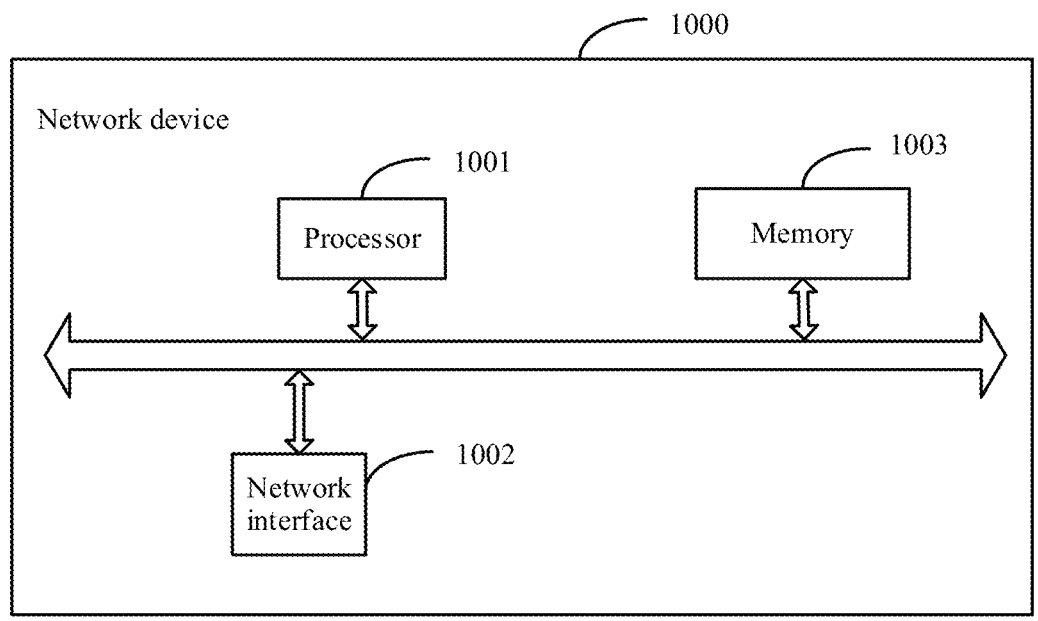
FIG. 10 is a schematic diagram of a structure of a network device according to an embodiment.

Referring to FIG. 10, an embodiment provides a network device 1000. The network device 1000 may be a router, a switch, or a network device having a forwarding function. The network device 1000 can implement functions of the first network device or the second network device in the foregoing method embodiment. The network device 1000 includes a processor 1003, a network interface 1002, and a memory 1001. The memory may be configured to store program code and data of the network device, and the processor 1003 is configured to invoke a program instruction in the memory 1001 to perform the method shown in the foregoing embodiment. For a specific execution step, refer to the foregoing embodiment. Details are not described herein.

Figure 11:
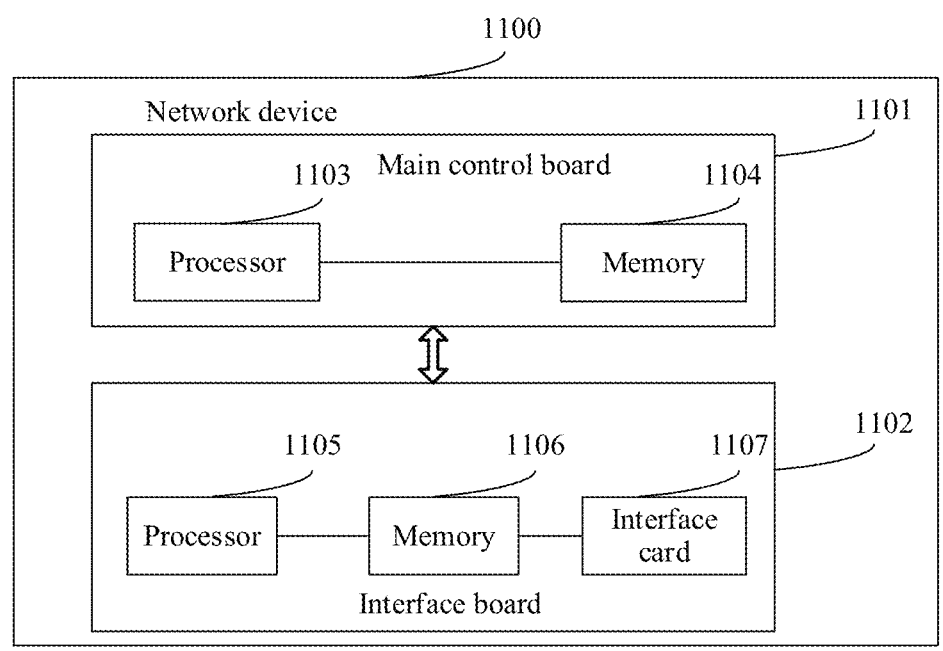
FIG. 11 is a schematic diagram of a structure of another network device according to an embodiment.

Referring to FIG. 11, an embodiment provides a network device 1100. The network device 1100 may be a router, a switch, or a network device having a forwarding function. The network device 1000 can implement functions of the first network device or the second network device in the foregoing method embodiment. The network device 1100 includes a main control board 1101 and an interface board 1102. The main control board 1101 includes a processor 1103 and a memory 1104. The interface board 1102 includes a processor 1105, a memory 1106, and an interface card 1107. The main control board 1101 is coupled to the interface board 1102.

The memory 1104 may be configured to store program code of the main control board 1101, and the processor 1103 is configured to invoke the program code in the memory 1104 to perform a corresponding operation of packet processing.

The memory 1106 may be configured to store program code of the interface board 1102, and the processor 1105 is configured to invoke the program code in the memory 1106 to perform a corresponding operation of packet receiving or sending.

In an example implementation, an inter-process communication IPC control channel is established between the main control board 1101 and the interface board 1102.

An embodiment further provides a computer storage medium, configured to store a computer software instruction used by the first network device or the second network device in the embodiment shown in FIG. 2, where the computer software instruction includes a program used to perform the method in the foregoing method embodiment.

"First" in the first network device in the embodiments is merely used as a name identifier, and does not represent the first in sequence. For the words "second" and "third", this rule also applies.

Methods or algorithm steps described in combination with the content disclosed in the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a hard disk, a removable hard disk, a compact disc, or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium, where the communications medium includes any medium that facilitates transmission of a computer program from one place to another. The storage medium may be any available medium accessible to a general-purpose or special-purpose computer.

In the foregoing example implementations, the objectives, technical solutions, and beneficial effects of the present disclosure are further described in detail. It should be understood that the foregoing descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A method for forwarding a packet in a segment routing multi-protocol label switching (SR MPLS) network, wherein the method comprises:
    obtaining, by a first network device, a first packet, wherein the first packet comprises first indication information and payload data, wherein the first indication information is used to indicate to generate a plurality of packets according to the first packet, wherein the first indicating information is one multi-protocol label switching (MPLS) label, wherein the SR MPLS network includes the first network device;
    generating a plurality of second packets according to the MPLS label in the first packet, wherein each of the plurality of second packets comprises the payload data and the MPLS label; and
    separately sending, by the first network device, the plurality of second packets over different forwarding paths to a plurality of second network devices, wherein each of the second network devices is a forwarding network device in the SR MPLS network, wherein each of the different forwarding paths is used to forward one of the plurality of second packets.

2. The method according to claim 1, wherein the MPLS label is received from a controller.

3. The method according to claim 1, wherein the MPLS label corresponds to a first function, the first function is configured to instruct the first network device upon receiving the packet including the MPLS label to generate the plurality of second packets.

4. The method according to claim 1, wherein
    before generating, by the first network device, the plurality of second packets according to the MPLS label in the first packet, the method further comprises:
    determining, by the first network device, an operation type corresponding to the MPLS label, wherein the operation type corresponding to the MPLS label is used to instruct the first network device to replicate the first packet to generate the plurality of second packets.

5. The method according to claim 1, wherein obtaining, by the first network device, the first packet comprises:
    receiving, by the first network device, the first packet; or
    generating, by the first network device, the first packet.

6. The method according to claim 1, wherein each packet of the plurality of second packets further comprises a same packet sequence number.

7. The method according to claim 1, wherein an MPLS label stack of the first packet comprising the MPLS label.

8. A first network device in a segment routing multi-protocol label switching (SR MPLS) network, the first network device comprising:
    a processor; and
    a memory coupled to the processor and storing instructions for execution by the processor, wherein the instructions instruct the processor to cause the first network device to:
    obtain a first packet, wherein the first packet comprises first indication information and payload data, wherein the first indication information is used to indicate to generate a plurality of packets according to the first packet, wherein the first indicating information is one multi-protocol label switching (MPLS) label;
    generate a plurality of second packets according to the MPLS label in the first packet, wherein each of the plurality of second packets comprises the payload data and the MPLS label; and
    separately send the plurality of second packets over different forwarding paths to a plurality of second network devices, wherein each of the second network devices is a forwarding network device in the SR MPLS network, wherein each of the different forwarding paths is used to forward one of the plurality of second packets.

9. The first network device according to claim 8, wherein the MPLS label is received from a controller.

10. The first network device according to claim 8, wherein the MPLS label corresponds to a first function, and the first function is configured to instruct the first network device to generate the plurality of second packets.

11. The first network device according to claim 8, wherein the instructions further instruct the processor to cause the first network device to:
    determine an operation type corresponding to the MPLS label,
    wherein the operation type is used to instruct the first network device to replicate the first packet to generate the plurality of second packets.

12. The first network device according to claim 8, wherein the instructions further instruct the processor to cause the first network device to:
    receive the first packet; or
    generate the first packet.

13. The first network device according to claim 8, wherein each packet of the plurality of second packets comprises a same packet sequence number.

14. The first network device according to claim 8, wherein an MPLS label stack of the first packet comprises the MPLS label.

15. A system for forwarding a packet in a network, wherein the network is a segment routing multi-protocol label switching (SR MPLS) network, and wherein the system comprises:
    a first network device and a plurality of second network devices, wherein the first network device is configured to:
    obtain a first packet, wherein the first packet comprises first indication information and payload data, wherein the first indication information is used to indicate to generate a plurality of packets according to the first packet, wherein the first indicating information is one multi-protocol label switching (MPLS) label;
    generate a plurality of second packets according to the MPLS label in the first packet, wherein each of the plurality of second packets comprises the payload data and the MPLS label; and
    separately send the plurality of second packets over different forwarding paths to the plurality of second network devices, wherein each of the plurality of second network devices is a forwarding network device in the SR MPLS network, wherein each of the different forwarding paths is used to forward a different second packet of the plurality of the second packets;

each of the plurality second network devices is configured to:

receive one of the plurality of the second packets;

generate a plurality of third packets according to the MPLS label, wherein each of the plurality of third packets comprises the payload data and the MPLS label; and separately forward the plurality of third packets over different forwarding paths.

* * * * *